April 3, 1928.  1,664,826
E. MESSER
METHOD OF MARKING CONFECTIONERY
Filed Oct. 24, 1923
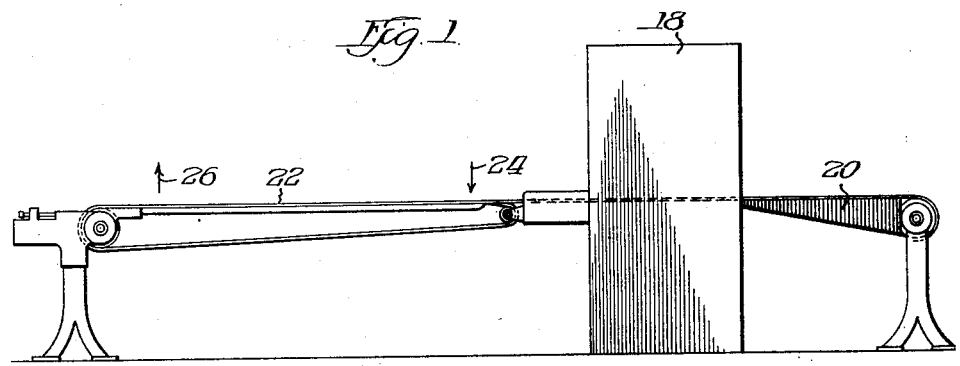
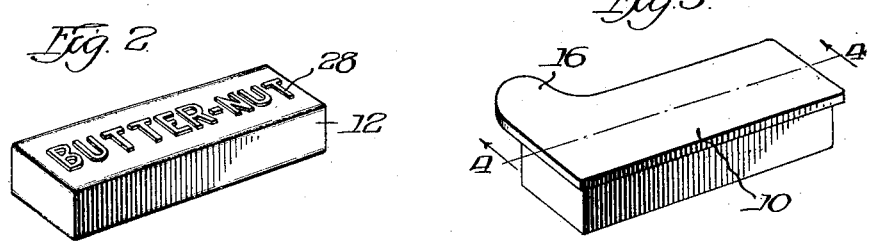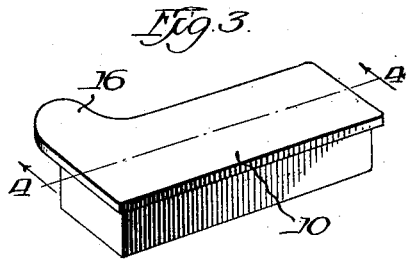
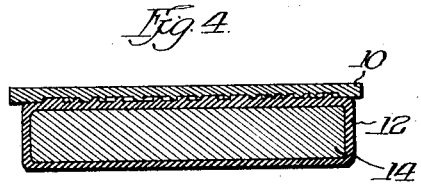
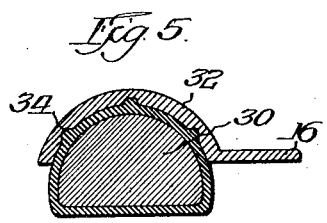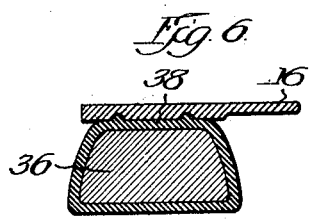
Witness:
Inventor:
Edward Messer Patented Apr. 3, 1928.

1,664,826

UNITED STATES PATENT OFFICE.

EDWARD MESSER, OF PITTSBURGH, PENNSYLVANIA.

METHOD OF MARKING CONFECTIONERY.

Application filed October 24, 1923. Serial No. 670,401.

My invention relates to the confectioner's art, and more specifically to an improved method and means for making pieces of confectionery with patterns or designs thereon.

In order to enable others skilled in the art to practice the invention, I shall hereinafter describe in detail one specific product, and the specific method and means employed in the production thereof.

In the accompanying drawings:—

Fig. 1 is a more or less diagrammatic side elevation of an automatic candy dipping machine;

Fig. 2 is a perspective view of a finished piece of candy;

Fig. 3 is a similar view of the same piece of candy before the die has been removed;

Fig. 4 is a section on line 4—4 of Fig. 3;

Fig. 5 is a similar section of a modified confection and the die therefor; and

Fig. 6 is a similar section of another modification.

In the embodiment of the invention selected for illustration, the novel die employed comprises a body 10 to impress the variations of shape in the face thereof on the coating 12 of the piece 14 while the coating is still in a semi-fluid or plastic condition.

For convenience in handling the die, the body 10 is provided with a laterally projecting lug 16 under which the operator's finger may be positioned to lift the die off the piece surely and quickly and without injurying the piece.

The die is preferably flexible to facilitate cleaving from the candy, and should have a surface adapted to the nature of the substance with which it is to make contact. I have tried nickel, silver, and tin plated metals, aluminum, glass, bone, celluloid and lacquered objects. On chocolate coated candy best results have so far been obtained with celluloid or flexible metal having a smooth surface.

In Fig. 1 any suitable or preferred type of automatic candy dipping machine is indicated at 18, which machine is provided with the charging means 20 and the conveyor belt 22 to receive the coated candies and carry them along until they have cooled sufficiently to be handled and packed or otherwise disposed of.

In practicing the invention with the machine indicated, one operator stands at the position indicated by arrow 24 with a supply of the dies, and lays one die on top of each piece of candy as it passes out of the machine with the coating fresh and plastic. By the time the conveyor has moved the pieces to the point indicated by arrow 26, they will have cooled sufficiently for the characters 28 to retain their shape. At this point another operator picks up the dies, which can be accumulated in a suitable basket or receptacle and sent back to the first operator at point 24 for use over again.

In this way a large number of very attractive and highly intricate designs can be impressed on the surface of the finished confection, with a fineness of detail and uniformity of execution that cannot even be approximated where each piece has to be decorated by hand by a skilled operator, and at a relatively small fraction of the cost of hand ornamentation.

The impression on the candy may be used for other purposes besides decoration. Thus the flavor of the contents of each piece of candy, or even the identification of said contents may be given on the outside of the coating. In this way a box of candy can be made up with each piece clearly marked to indicate the contents. This is highly desirable as it enables each individual to avoid candy not suited to his individual taste, without spoiling any pieces which others would enjoy.

Without further elaboration, the foregoing will so fully explain the gist of my invention, that others may, by applying current knowledge, readily adapt the same for use under various conditions of service. It will, for instance, be obvious that it is immaterial whether coated candy is coated by hand or by machine, and that other than coated candies can be similarly treated. A wide variety of shapes and sizes of dies and pieces of candy may be involved. Thus in Fig. 5 the candy may have either a cylindrical or a spherical outer surface, and the die may be curved to correspond, except that any raised characters at the side must not incline upwardly away from the central vertical plane, as this would interfere with removing the die. Similarly, Fig. 6 illustrates a small round piece 36 with a flat top 38. This is a very common shape in the confectionery now on the market.

These and many other modifications and adaptations may readily be made without eliminating certain features which may be said to constitute the essential items of novelty involved, which items are intended to be defined and secured to me by the following claims.

I claim:—

1. The method of marking confectionery which comprises coating a center with chocolate, laying a patterned die plate on top of the coated center while the coating is still soft and plastic, cooling the coating while the die plate remains on the coating by its own weight and then removing the die plate from the coating, whereby the top surface of the coated candy is impressed with the design of the die plate.

2. The method of marking confectionery which comprises coating a center with a covering, laying a patterned die plate on top of the covering while the covering is still soft and plastic, cooling the covering while the die plate remains in place and then removing the die plate from the covering, whereby the top surface of the finished candy is impressed with the design of the die plate.

In witness whereof, I hereunto subscribe my name this 16 day of October, 1923.

EDWARD MESSER.